(12) United States Patent
Wysocki

(10) Patent No.: US 8,504,189 B2
(45) Date of Patent: Aug. 6, 2013

(54) DEVICE AND METHOD FOR TRANSPORTING PRODUCE OVER A VERTICAL DISTANCE

(75) Inventor: Gary Joseph Wysocki, Bancroft, WI (US)

(73) Assignee: Paragon Potato Farms, Inc., Bancroft, WI (US)

( * ) Notice: Subject to any disclaimer, the term of this patent is extended or adjusted under 35 U.S.C. 154(b) by 964 days.

(21) Appl. No.: 12/561,432

(22) Filed: Sep. 17, 2009

(65) Prior Publication Data

US 2011/0066279 A1 Mar. 17, 2011

(51) Int. Cl.
G06F 7/00 (2006.01)
(52) U.S. Cl.
USPC .......................................................... 700/218
(58) Field of Classification Search
USPC .......................................................... 700/218
See application file for complete search history.

(56) References Cited

U.S. PATENT DOCUMENTS

| | | | |
|---|---|---|---|
| 3,805,895 A | 4/1974 | Teigen | |
| 4,249,660 A | 2/1981 | Woodland | |
| 6,955,119 B2 * | 10/2005 | Bobren et al. | 100/7 |
| 2002/0060129 A1 * | 5/2002 | Cooper et al. | 198/443 |
| 2004/0245157 A1 * | 12/2004 | Stone | 209/552 |

OTHER PUBLICATIONS

Maly, P. et al., "Gentle harvest of potatoes in storage boxes," Agricultural Engineering International: the CIGR Ejournal, Manuscript FP 05 002 (Oct. 2005) vol. VII, 11 pages.

* cited by examiner

Primary Examiner — Ramya Burgess
(74) Attorney, Agent, or Firm — Michael Best & Friedrich LLP

(57) ABSTRACT

The invention provides a device for transporting produce. The device comprises a chute, and a flexible panel that is positioned within tracks of the chute and defines a movable "front" wall of the chute. The flexible panel has a lower section that terminates in a platform section. The flexible panel is operatively connected to a motor or other actuator which allows the flexible panel to be raised and lowered within the tracks of the chute. The platform section of the chute is connected to an actuator which can move the platform from a closed position to an open position. When the platform is in the closed position, the platform defines the bottom of the chute and collects and holds the produce delivered into the chute. When the platform is moved into the open position, the produce is allowed to flow out of the bottom of the chute into the container the chute is positioned in. The device can also comprise a fill sensor indicating when the chute is full. A central processing unit (CPU) and/or control relays are operatively connected to the fill sensors as well as to the motor and the actuator, such that the CPU can determine when to raise and lower the flexible panel and open and close the platform based on the sensor signals to coordinate transporting produce from the top of the chute to the bottom of the chute.

10 Claims, 10 Drawing Sheets

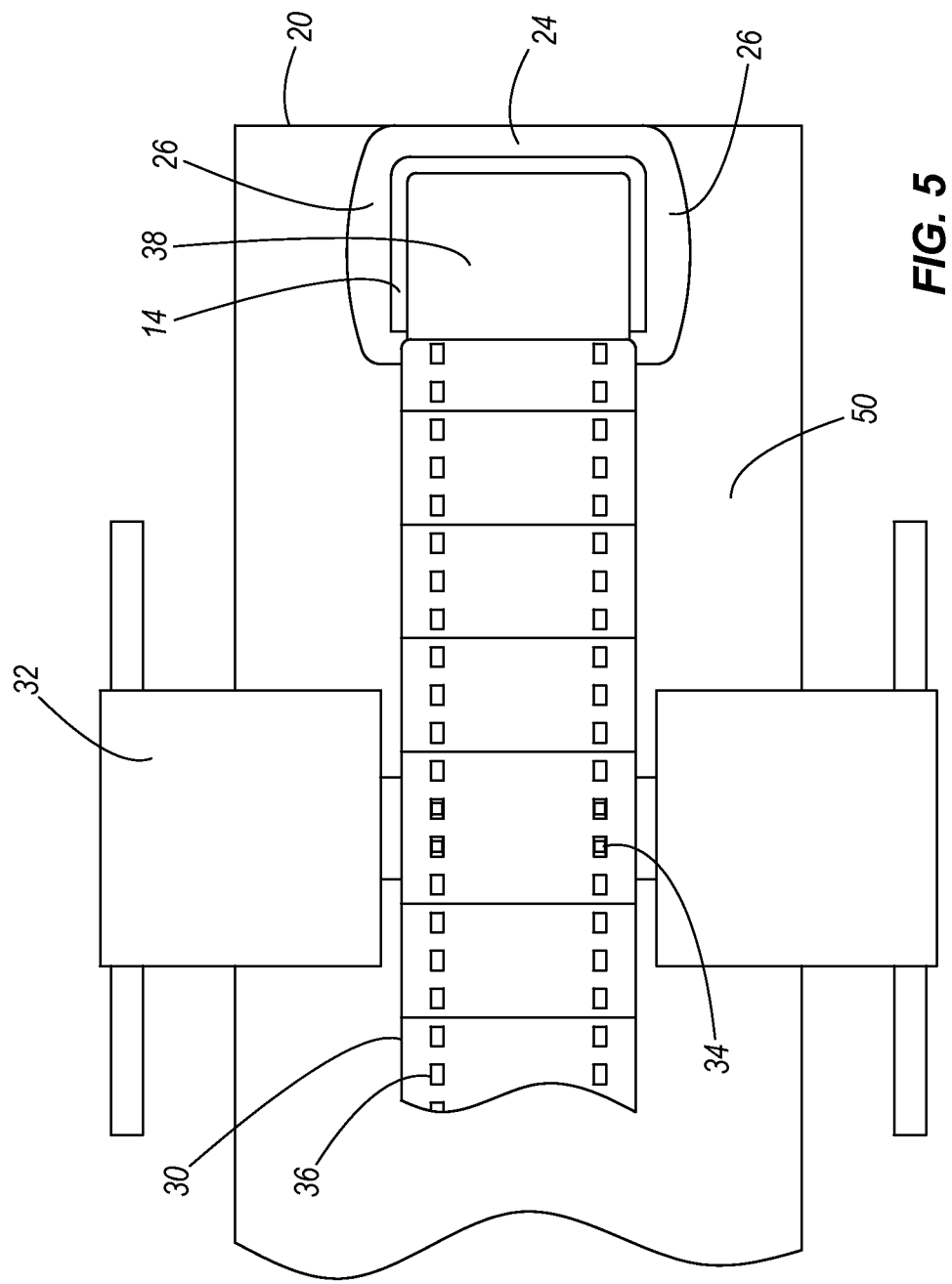

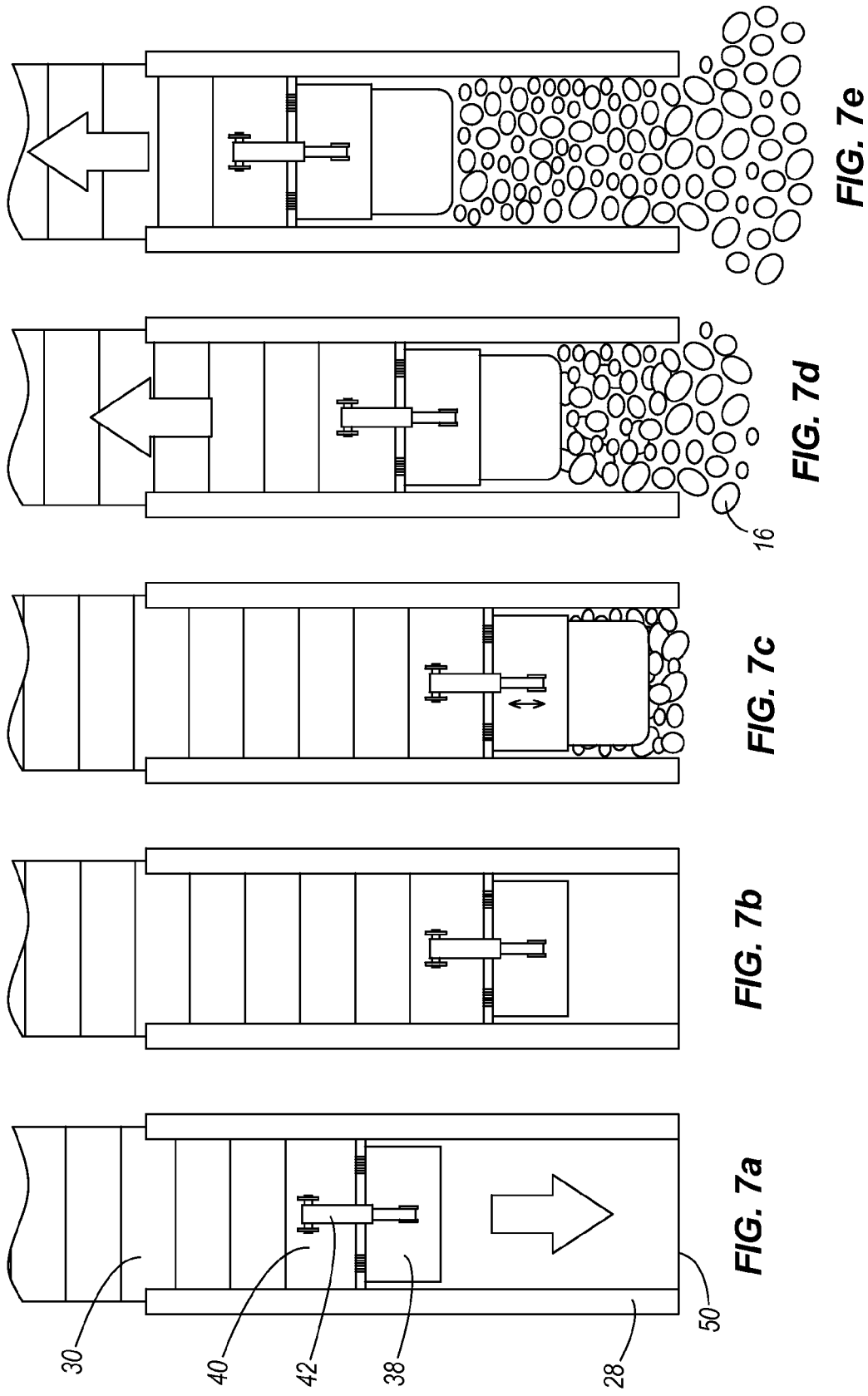

DEVICE AND METHOD FOR TRANSPORTING PRODUCE OVER A VERTICAL DISTANCE

BACKGROUND OF THE INVENTION

This invention is related to the transportation of produce over a vertical distance. In the food packaging and processing industry it is common for food to be deposited into large storage containers from the top of the container. Oftentimes, when the container is initially filled, the food will enter the container from the top and drop to the bottom of the container. With large containers this drop may be 16 feet or more. Any produce falling greater than 1 foot will be subject to damage from the fall, leading to bruised or smashed produce that renders the produce unsuitable for use or sale. The present invention relates to a novel device and method for transporting materials, primarily produce, over a vertical distance, such that the produce can be delivered to the lower height, such as the bottom of a container, from a higher height, such as the top of a container. The device and method allows for the vertical transport of the produce without damaging the produce while still allowing for a fast, automated process to be used to fill the container.

SUMMARY OF THE INVENTION

The present invention provides a device for transporting produce, such as potatoes, apples, oranges, grapefruit, onions, cucumbers etc. over a vertical distance. The device comprises a chute which can be wholly and/or partially integral to or separately placed in a container. The chute has a back wall, sidewalls and vertical tracks positioned on one end of the sidewalls for receiving a vertical panel. A vertical panel is positioned within the tracks of the chute and defines a movable "front" wall of the chute. In one embodiment, the vertical panel comprises a flexible panel. The flexible panel has a lower section that terminates in a platform section. When the flexible panel is positioned in the chute, the platform section defines the "bottom" of the chute. The flexible panel is operatively connected to a motor or other actuator which allows the flexible panel to be raised and lowered within the tracks of the chute. The platform section of the chute is connected to an actuator which can move the platform from a closed position to an open position. When the platform is in the closed position, the platform defines the bottom of the chute and collects and holds the produce delivered into the chute. When the platform is moved into the open position, the produce is allowed to flow out of the bottom of the chute into the container the chute is positioned in. The device can also comprise a fill sensor indicating when the chute is full. The fill sensor suitably can be positioned a predetermined distance from the top of the chute. In one embodiment a level sensor or sensors can be used. The level sensor or sensors can be positioned along the vertical length of the chute. A central processing unit (CPU) and/or control relays are operatively connected to the fill and level sensors as well as to the motor and the actuator, such that the CPU can determine when to raise and lower the flexible panel and open and close the platform based on the sensor signals. Thus, the CPU controls the movement of the flexible panel and the platform section such to coordinate transporting produce from the top of the chute to the bottom of the chute.

In other embodiments, a bottom sensor is attached to or near the platform and is also connected to the CPU and/or control relays. The bottom sensor informs the CPU when the platform section is near the bottom of the container or near the bottom of produce positioned in container. When the CPU has been signaled that the platform section is near the bottom of the container or produce contained in the container, the CPU knows to signal the actuator to open the platform and release the produce in the chute into the container. In other embodiments the level and/or fill sensors are used along with the CPU which is programmed with preprogrammed patterns of delays and other control logic on when to move the flexible panel up and down, and when to open and close the platform section. In another embodiment, the level, bottom and/or fill sensors are unnecessary and the CPU itself is programmed with preprogrammed patterns of delays on when to move the flexible panel up and down, and when to open and close the platform section. The CPU can also be preprogrammed with what specific distances to move the platform section up and down, and when. The CPU thus lowers the flexible panel, and opens and closes the platform section according to a preprogrammed pattern that allows for the container to be filled by the device. In yet another embodiment fill sensors, level sensors and/or bottom sensors can be used together or separately to trigger preprogrammed patterns in the CPU for controlling the flexible panel and the platform section. The CPU thus controls the movement of the flexible panel and the platform section to coordinate transporting produce from the top of the chute to the bottom of the chute.

The device above is utilized in one aspect to deliver produce over a vertical distance from the top of the chute to the bottom of the chute. Suitably, the chute is either positioned in, or is integral with, a container. Suitably, the top of the chute is adjacent to the top of the container. In one embodiment, produce is delivered towards the opening of the chute via a conveyor. The produce falls off the end or side of the conveyor into the opening at or near the top of the chute. At the beginning of the process, the flexible panel of the chute is raised to a starting position such that the platform section on the bottom of the flexible panel is a predetermined distance near the top of the chute. The platform is in the closed position so that produce entering the chute falls only a short predetermined distance till it reaches and rests on the platform section. As produce is continually or intermittently delivered into the chute by the conveyor, the chute begins to fill. When the fill sensor determines that the produce has filled the chute such that it has reached a certain predetermined height from the top of the chute, the sensor indicates that the chute is full. The CPU connected to the fill sensor receives the "full" signal from the fill sensor and signals the motor to lower the flexible panel. As the flexible panel is lowered, the platform section is lowered further down into the chute, allowing more space at the top of the chute that can be filled by produce falling from the conveyor. The panel section is lowered until the fill sensor "clears", sending or canceling a signal to the CPU which in turn stops the lowering either immediately or after a preprogrammed period of time. This process is repeated until the platform section is near either a predetermined distance from the bottom of the container, or a predetermined distance, which may be zero, from any produce already resting on the bottom of the container. This can be done by the use of level sensors, bottom sensors, or simply by use of a programmed pattern of distances and/or times of movement of the flexible panel and the platform section in the CPU. As the fill sensor continues to send a "full signal" and the platform section has reached the preprogrammed distance from the bottom of the container or from the produce in the container, the either the weight of the produce in the chute forces open the platform section which is under a certain predetermined amount of resistance provided by the actuator or the CPU triggers the actuator to move the platform section into the open position, allowing the produce to flow out of the chute into the container allowing more space at the top of the chute that can be filled by produce falling from the conveyor. As the fill sensor continues to send a "full" signal, the platform section is repeatedly cycled open to close or remains in the open position and the platform is raised according to pre-programmed delays and other control logic until the fill sensor "clears" at which time platform movement and cycling ceases. As the chute receives more produce from the conveyor and the fill sensor sends a "full" signal to the CPU the process is again repeated until the container is filled with produce. When the level sensors, bottom sensors, or predetermined pattern indicate to the CPU that the container is full of produce to a predetermined point near the top of the container, the flexible panel can be raised out of the chute and produce can fall directly onto the produce into the container.

BRIEF DESCRIPTION OF THE DRAWINGS

FIG. 5 depicts a top view of the present invention operating in a container.

FIG. 7a-7e depicts a back view of the chute, flexible panel, platform section and actuator of the present invention.

DETAILED DESCRIPTION OF THE INVENTION

Before any embodiments of the present invention are described in detail, it is to be understood that the invention is not limited in its application to the details of construction and the arrangement of components set forth in the following description. The present invention is capable of other embodiments and of being practiced or of being carried out in various ways. Also it is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items.

The present invention provides a device for transporting produce over a vertical distance. Suitably the device is used in conjunction with large storage containers such that produce can be fed into the present invention from a conveyor and the produce can be delivered to the bottom of the storage container while avoiding damage to the produce that normally would occur if it were to drop from the top to the bottom of an unfilled container. While the present invention was particularly designed with the transportation of produce in mind, any bulk material may be transported over a vertical distance by the present invention.

Figure 1:
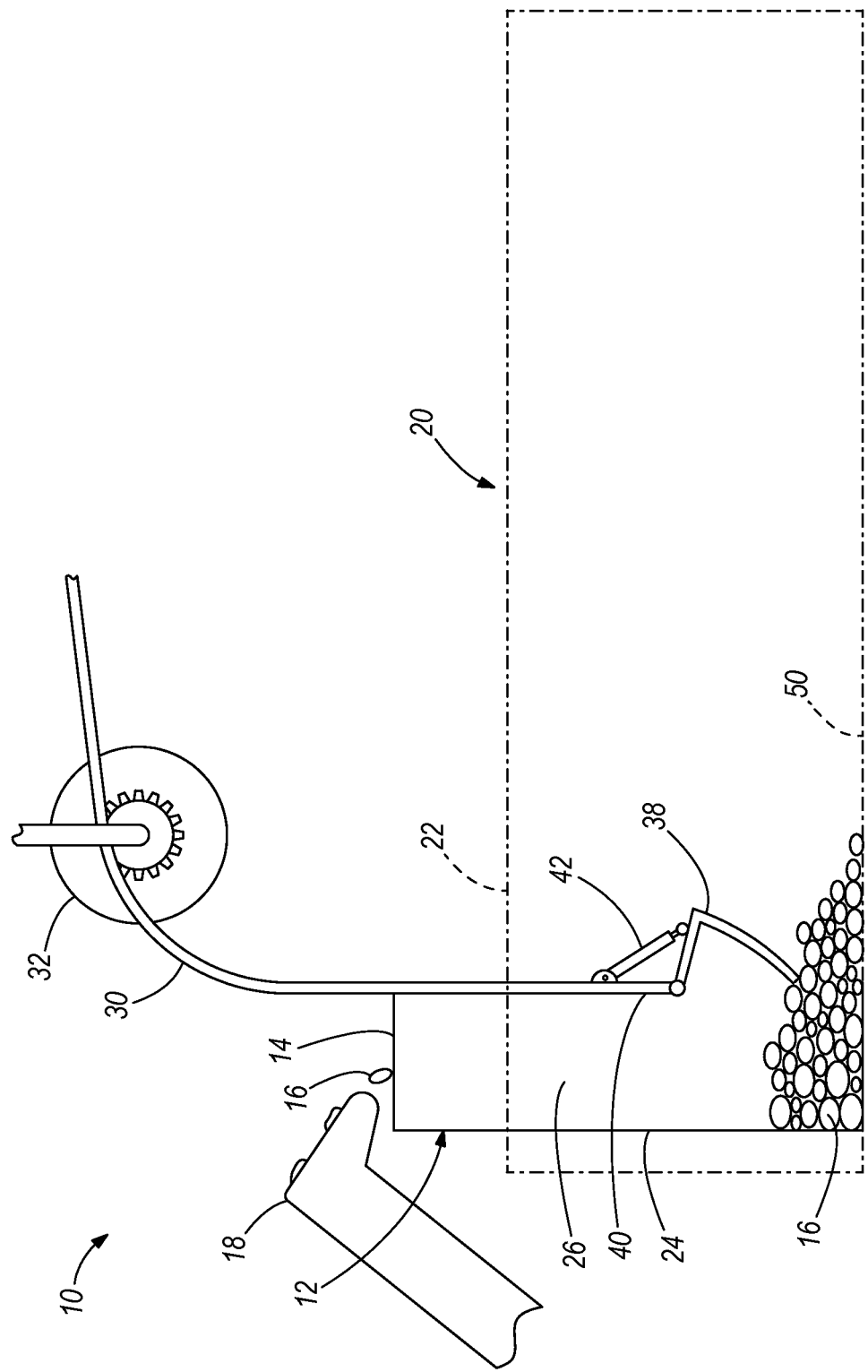
FIG. 1 depicts a side view the device of the present invention operating in a container. The container is shown in a cut-away view.
Figure 4:
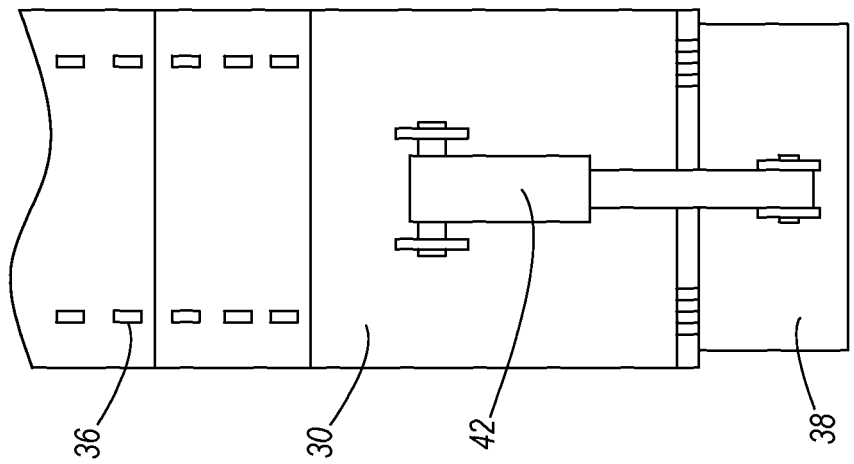
FIG. 4 depicts a back view of the flexible panel, platform section and actuator of the present invention, with the platform section is in a closed position.

FIG. 1 depicts one embodiment of an overall arrangement of the invention. The transportation device 10 comprises a chute 12 that has a top opening 14 that receives produce 16. Suitably, the produce 16 can be fed into the chute 12 by means of a conveyor system 18, or similar automated conveyance. The chute 12 is suitably positioned within a container 20. The chute 12 can be physically secured to the container 20, or can be hung on a container 20 at the top of the container. The chute 12 can be removed from the container 20 if desired.

Suitably, the top opening 14 of the chute is positioned adjacent to the top 22 of the container 20. The opening 14 of the chute can be above or below the plane of the top of the container 20. The chute 12 is also depicted in FIGS. 5-9. The chute 12 has a back wall 24 that can be separate from or integral to the walls of the container 20. In one embodiment, a wall of the container 20 itself can act as the back wall 24 of the chute 12. The chute 12 also has a pair of side walls 26 that extend outward from the back wall 24 of the chute 12. Similar to the back wall 24, the side walls 26 may be separate from or integral to the walls of the container. Each side wall 26 has a track section 28 designed to receive a portion of a movable panel. One of skill in the art will recognize that the chute may be oriented with respect to any of the walls of the container and that the terms "side" and "back" wall are used for descriptive reference only. Again, the tracks may be integral to the container walls, integral to separate chute walls, or be suitably fastened or otherwise attached to the walls of either the chute or the container itself. The chute 12 can be constructed of any suitable sturdy material such as metal or plastic.

In the embodiment shown in FIGS. 1-12, the panel comprises a flexible panel 30. A portion of the flexible panel 30 is received by the track sections 28. Suitably, the track sections receive the sides of the flexible panel 30. The flexible panel 30 can be made from a flexible material such as plastic or high strength textiles. The panel 30 could also be made out of metal, constructed in jointed segments allowing for the overall panel to be flexible. One skilled in the art will recognize that various forms of rigid, flexible, and linked panels could be substituted depending on overhead space limitations and other constraints. When the flexible panel 30 is received by the chute 12, the flexible panel 30 acts as the front wall of the chute 12 and prevents this produce 16 that enters the chute 12 to spill out the front of the chute 12 between the track sections 28. A portion of the flexible panel 30 is operatively connected to a drive system. In one embodiment the drive system is a drive gearbox 34 which interfaces with gear treads 36 in the flexible panel 30. In one embodiment, the gearbox 34 used is a right angle worm drive. In one embodiment, when a plastic flexible panel 30 is utilized, the gear treads 36 can be molded directly into the flexible panel 30. In one embodiment, a motor 32 is connected to the drive system. One skilled in the art will recognize that various AC or DC motors could be used. In one embodiment a standard 3 phase AC electric motor with a 56C frame can be used. By turning the drive gearbox 34, the motor 32 can raise and lower the flexible panel 30 within the chute 12. The motor 32 and drive gearbox 34 or other drive mechanism may be placed above or adjacent the flexible panel, or in any other suitable location depending upon space and other local considerations. One skilled in the art will recognize that various combinations of gears, pulleys, belts, sprockets, and chains could be used in the drive system. In other embodiments, the drive system can be a roller system, ratchet system or other drive device which can actuate the movement of the flexible panel in an up and down manner in the chute 12.

Figure 3:
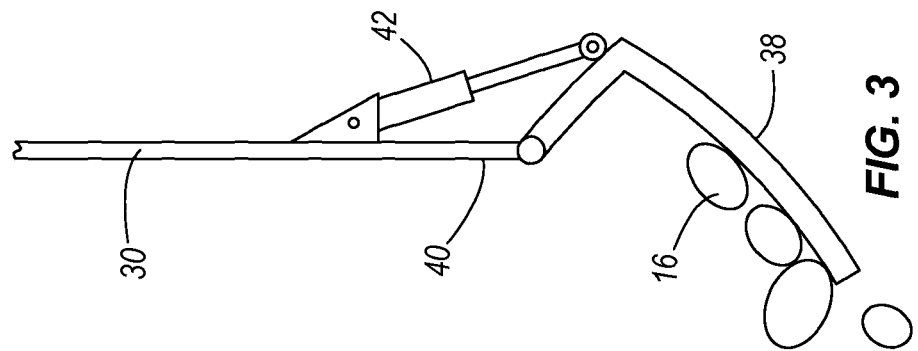
FIG. 3 depicts a side view of the flexible panel and platform section of the present invention, where the platform section is in an open position.
Figure 2:
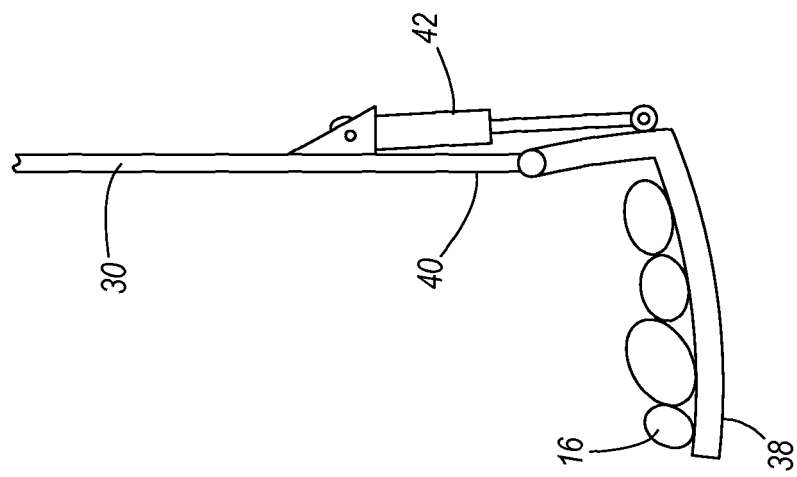
FIG. 2 depicts a side view of the flexible panel and platform section of the present invention, where the platform section is in a closed position.
Figure 6:
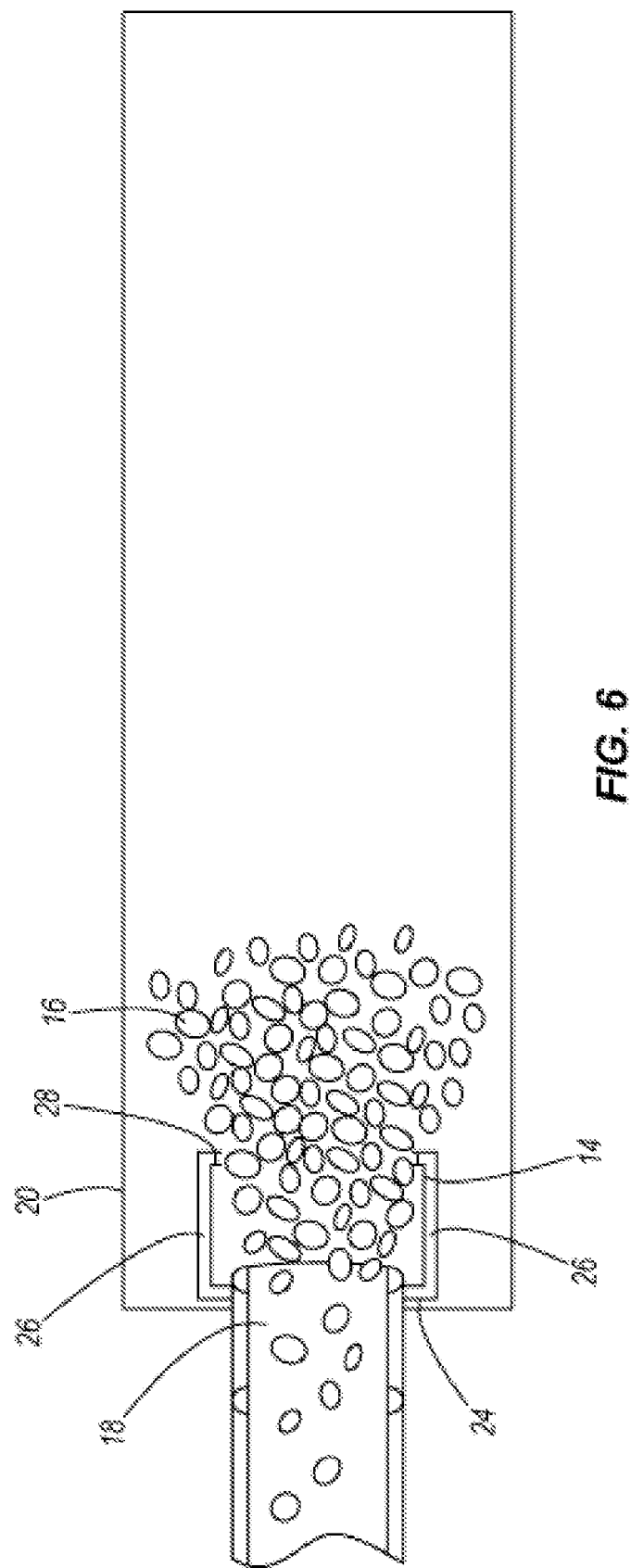
FIG. 6 depicts a top view of a portion of the present invention operating in a container, where the flexible panel is not shown.
Figure 10:
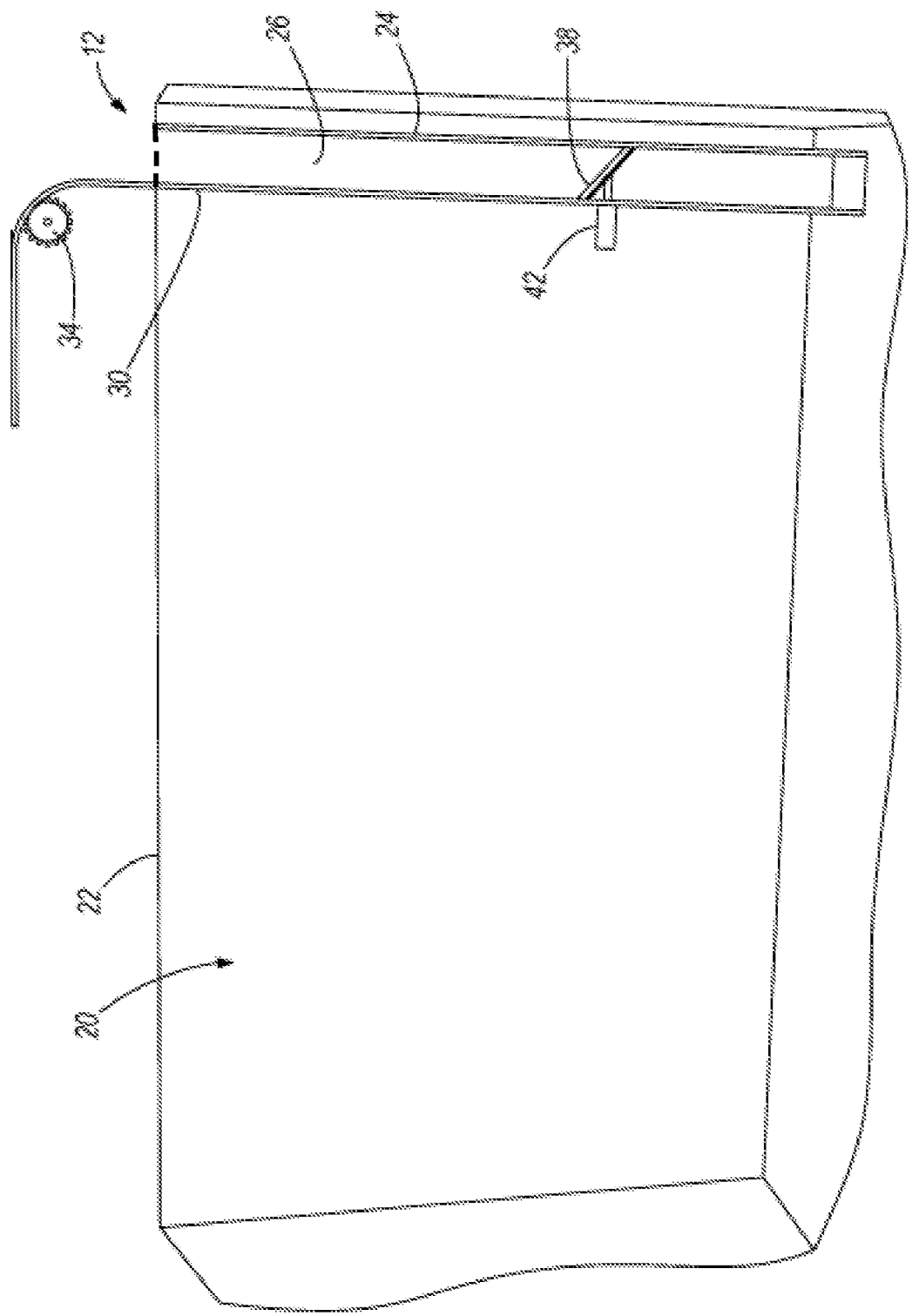
FIG. 10 depicts a side view cutaway view of another embodiment of the flexible panel, platform section in the closed position, and actuator of the present invention.
Figure 11:
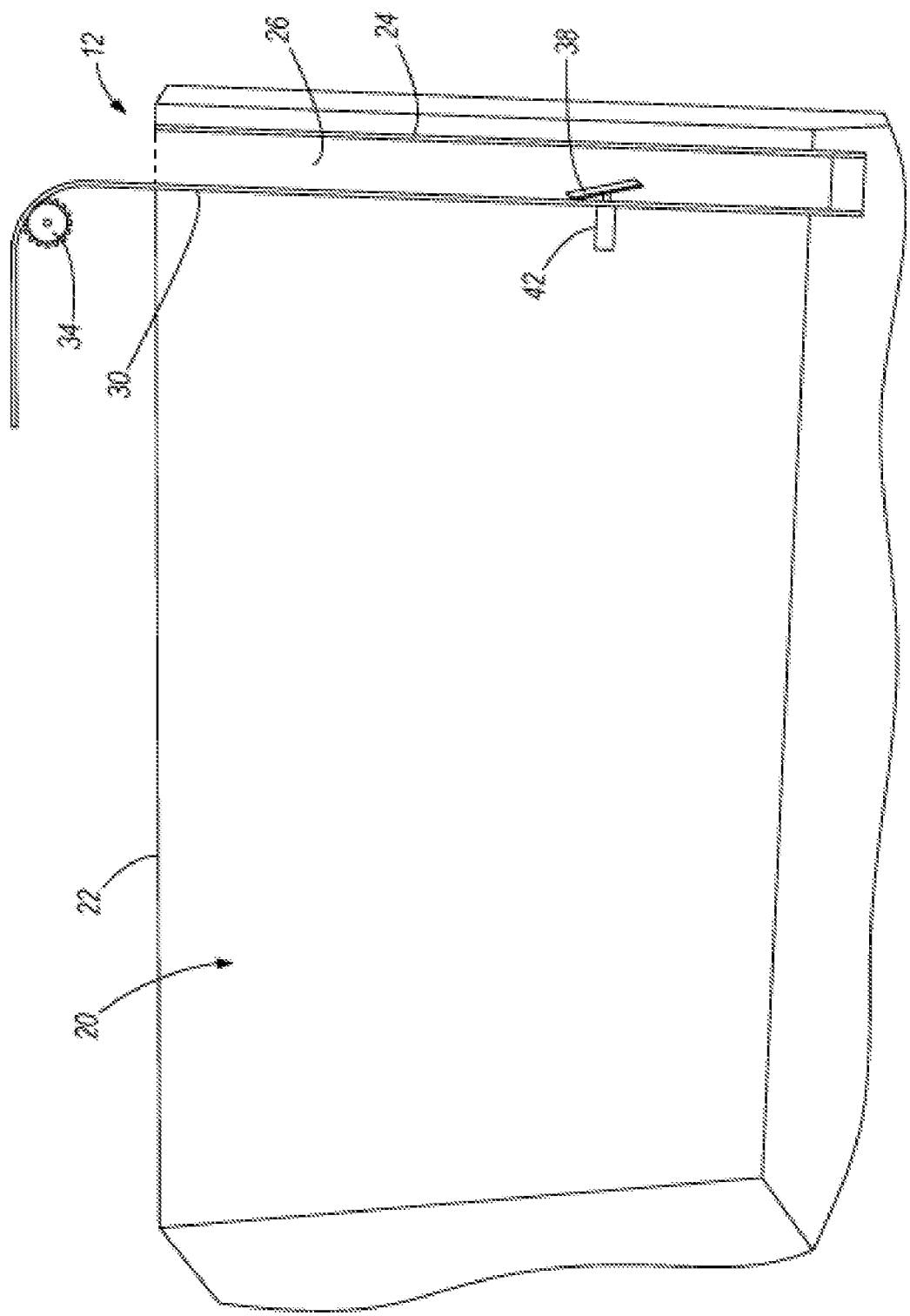
FIG. 11 depicts a side view cutaway view of another embodiment of the flexible panel, platform section in the open position, and actuator of the present invention.

A platform section 38 is operatively attached to the flexible panel 30. In one embodiment the platform section 38 is pivotally attached to the bottom 40 of the flexible panel. The platform section 38 is used to close off and define the bottom of the chute 12. The platform section 38 can be of any suitable design to accomplish this purpose. In one embodiment, shown in FIGS. 1-4, the platform section 38 is in an L shape with the top of the L shape platform 38 being hingedly connected to the bottom 40 of the flexible panel, and the bottom of the L shape platform 38 extending into the chute 12 and acting as the bottom of the chute 12. In another embodiment, shown in FIGS. 10 and 11, the platform section 38 is simply a rigid flat plate that can be positioned from an open to a closed position to close off the bottom of the chute. In this embodiment the platform section 38 is longer than the chute is deep (front to back), such that the door is closed when it is at a 45 degree angle off vertical. The platform section 38 is hingedly connected at one end to the flexible panel 30, and is also connected to an actuator 42 which can move the platform section 38 from a closed to an open position. FIGS. 2 and 10 show embodiments of the platform section 38 in the closed position, and FIGS. 3 and 11 show embodiments of the platform section 38 in an open position. When the platform 38 is in the closed position, the platform 38 defines the bottom of the chute 12 and collects and holds the produce 16 delivered into the chute. When the platform 38 is moved into the open position, the produce 16 is allowed to flow out of the bottom of the chute 12 into the container 20. The actuator 42 can be any suitable mechanical or pneumatic actuator that can move the platform 38 from an open to a closed position. Suitable examples of such actuators 42 are pneumatic cylinders, rotary actuators that attach at the hinge, hydraulic cylinders, screw actuators, rodless cylinders, solenoids and the like. Actuators can derive their power source from pneumatic (pressure and vacuum), hydraulic (cylinders and motors) and electric (motorized screws, magnetics) sources. As used herein, when it is referenced that the actuator 42 is connected to the platform section 38, this also encompasses situations where extending connectors such as rods, cables and the like connect the actuator 42 to the platform section.

Figure 9:
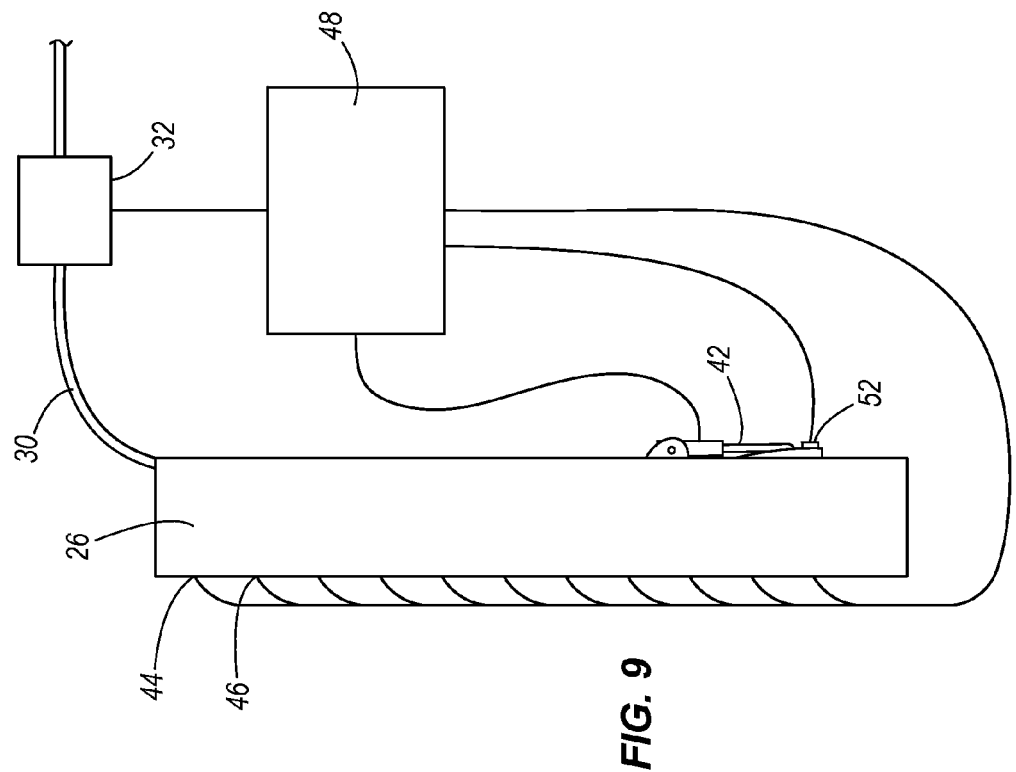
FIG. 9 depicts a side view of the chute, the sensors, cpu, motor, flexible panel and actuator of the present invention.
Figure 8:
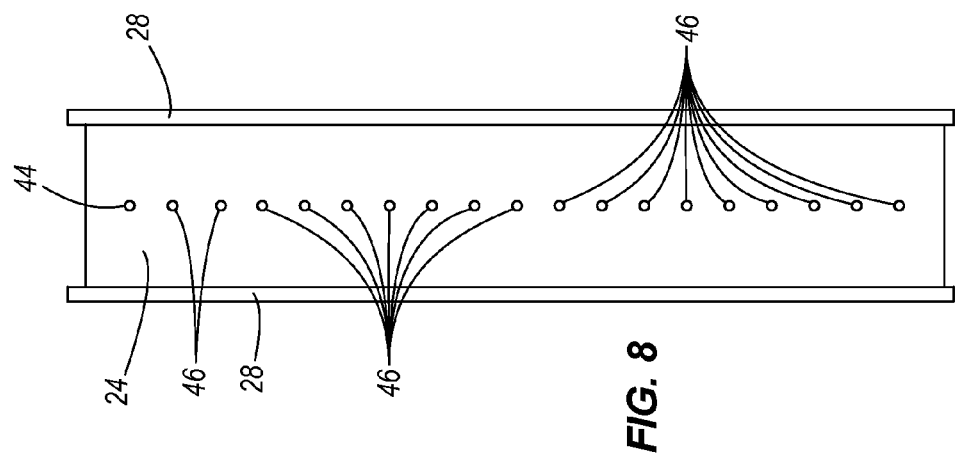
FIG. 8 depicts a back view of the chute and sensors of the present invention, without the presence of the flexible panel.

The device 10 can also comprise a number of sensors. The sensors are best shown in FIGS. 8-9. One of the sensors used is a fill sensor 44. In one embodiment, the fill sensor 44 is positioned a relatively short distance from the top opening 14 of the chute 12. The sensor 44 can be connected to the chute 12 itself, or on another adjacent structure. The fill sensor 44 is used to detect if the chute 12 is filled with produce 16 at the level of the sensor 44. Any suitable commercially available sensor that can accomplish this purpose can be used. In one embodiment, the fill sensor 44 is an optical sensor. In this embodiment the sensor 44 is positioned on the outside of the front or sidewall of the chute and a light from the sensor passes through an aperture in the back or sidewall of the chute 12 to detect the presence of produce at the specific level the fill sensor 44 is positioned in.

In one embodiment, the device can also comprise a level sensor 46 or a plurality of level sensors 46. Suitably, the level sensors 46 are positioned along the vertical length of the chute 12. The level sensors 46 can be used to determine the vertical positioning of the platform section 38, as well as the vertical height of any produce 16 that has been deposited in the container 20. Any suitable commercially available sensor that can accomplish these proposes can be used as a level sensor 46. In one embodiment, optical sensors are used. Other suitable sensors for both the fill 44 and level sensors 46 include proximity sensors, optical light beam sensors—reflecting and thru beam, sonar sensors, ultrasonic sensors, pressure sensors, motion sensors. The fill sensor 44 and level sensors 46 are operatively connected to a central processing unit (CPU) 48. An example of a commercially available CPU is a SIEMENS LOGO! 230RC 24 volt DC, but other commercially available CPU's will work. The CPU 48 is also operatively connected to the motor 32 and the actuator 42. The CPU could also be connected to the motor controls of the conveyor system 18 to stop and start the conveyor 18 if desired. In other embodiments, a counter circuit operable to count reference marks on the flexible panel 30, movements of a stepper-type drive motor 32, turns of the drive mechanism 34 or other reference proportional to the position of the flexible panel may be used as a means of direct or indirect level indication and/or control.

Figure 12A:
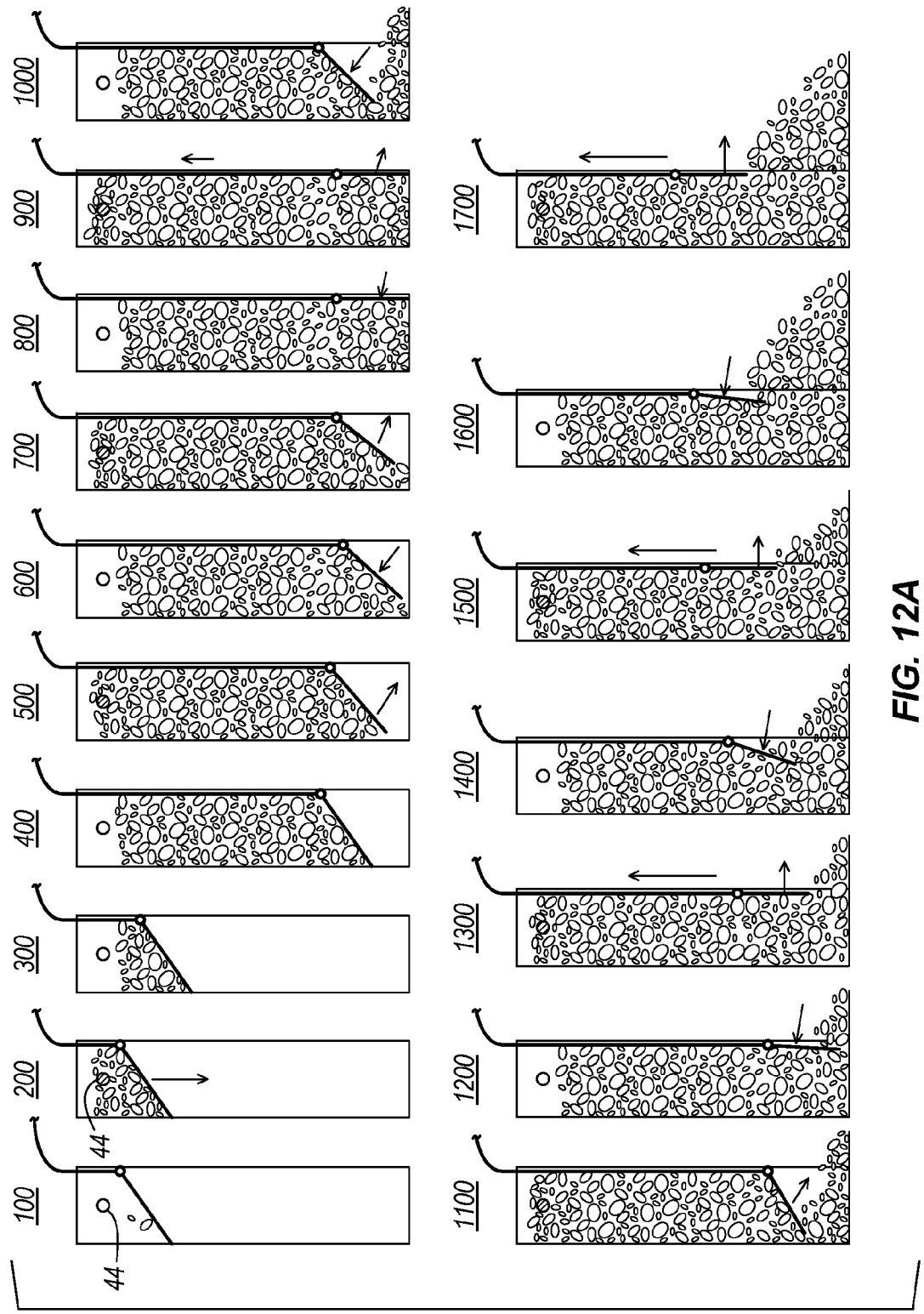
FIGS. 12A and 12B shows a step by step schematic showing the operation of the device of the present invention. The chute of the invention is shown in a partially cutaway sideview.
Figure 12B:
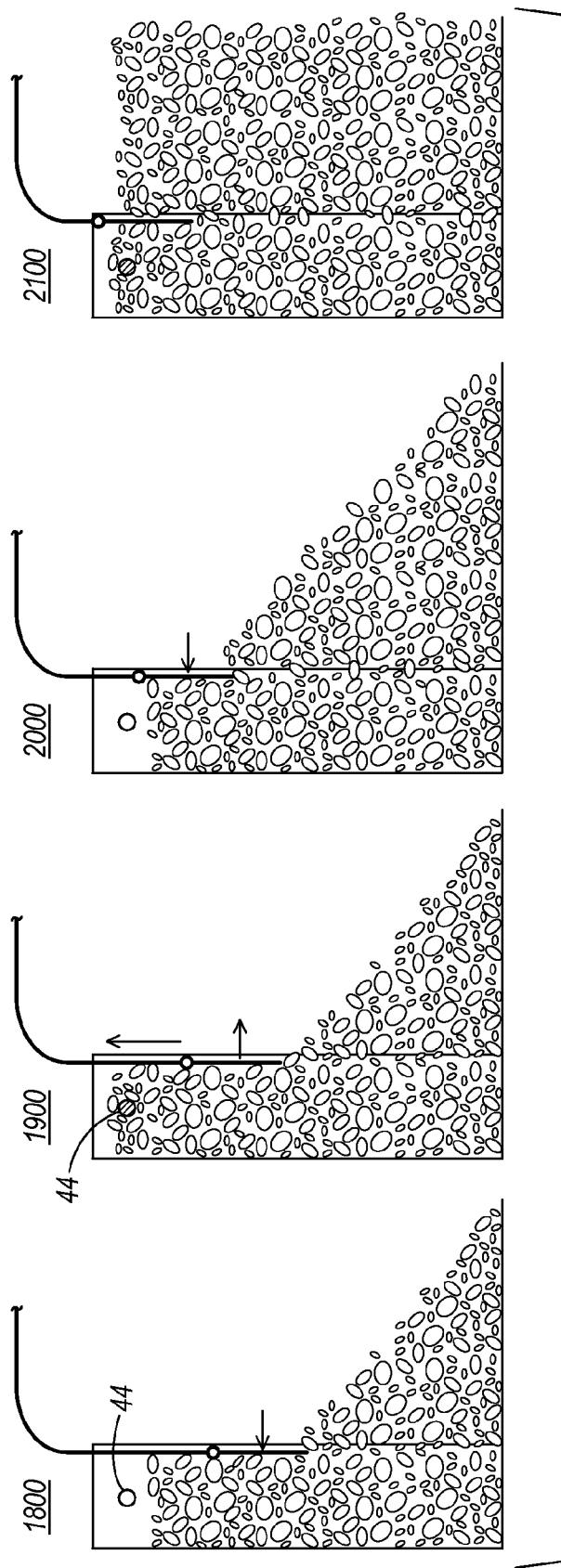

FIGS. 1-3, 6-7, and particularly FIGS. 12A and 12B best show the device 10 in operation. The flexible panel 30 is initially positioned so that the platform section 38 is near the top of the chute 12 and in the closed position. (See FIGS. 2 and 100 of FIG. 12A). Produce 16 is delivered towards the opening of the chute 12 via the conveyor system 18. The produce 16 falls off the end or side of the conveyor 18 into the opening of the top 14 or side of the chute 12. Produce 16 entering the chute 12 falls only a short distance until it reaches and rests either on the platform section 38 or on produce 16 already resting of the platform section 38. As produce 16 is continually delivered into the chute 12 by the conveyor 18, the chute 12 begins to fill with produce 16. When the fill sensor 44 determines that the produce 16 has filled the chute 12 to the level of the sensor 44, it signals the CPU 48 that the chute 12 is "full" (See 200 of FIG. 12A). The CPU 48 receives the "full" signal from the fill sensor 44 and signals the motor 32 to lower the flexible panel 30 a preprogrammed amount. (See 200 and 300 of FIG. 12A.) As the flexible panel 30 is lowered, the platform section 38 connected to the flexible panel 30 is lowered further down into the chute 12 (See FIG. 7b). This allows for more space at the top 14 of the chute 12 that can be filled by produce 16 falling from the conveyor 18. The flexible panel 30 is lowered until the fill sensor 44 "clears" sending or canceling a signal to the CPU which in turn stops the lowering of the flexible panel 30 either immediately or after a preprogrammed period of time. (See 300 in FIG. 12A). This process repeats over multiple cycles as the platform section 38 is slowly lowered into the chute each time the fill sensor indicates the chute is full (See 400 in FIG. 12A).

As the platform section 38 is lowered into the chute, the device can determine the positioning of the platform section in a number of different fashions, using different embodiments. In one embodiment, level sensors 46 detect the presence of the platform section 38 and signals this to the CPU 48 which can determine the vertical positioning of the platform section 38. As mentioned previously, other embodiments may substitute a variety of direct and indirect means of determining the vertical position of the platform section 38. When the CPU 48 determines that the vertical positioning of the platform section 38 is near the bottom 50 of the container 20, the CPU 48 signals the actuator 42 to move the platform section 38 into the open position (See FIGS. 1 and 3) releasing the produce 16 into the container 20 (See FIG. 7c).

In another embodiment, the actuator 42 can be set so that it provides enough resistance to keep the platform section 38 closed to support a certain amount of weight, i.e. the produce 16 resting on it, but will begin to move to an open position under the weight of the produce 16 resting on the platform section 38, i.e. if the weight goes over a predetermined amount. The resistance of the actuator can be set as needed as desired by the user and may vary based on the size of the container 20, the chute 12 or a determination by the user of when ideally the produce should be released. (See 500 of FIG. 12A).

In another embodiment, the platform section 38 has a bottom sensor 52 connected, but not necessarily attached, to the platform section 38, or adjacent to the bottom of the platform section 38 (such as on the flexible panel 30 or on the actuator 42). The bottom sensor 52 is used to sense the bottom of the container or the top of the pile of produce resting in the container. The sensor can be any suitable distance sensing sensor such as an ultrasonic sensor, optical sensor, infrared sensor or the like. In another embodiment the sensor can be a pressure sensing sensor that senses contact with the bottom of the container or produce in the container. When the bottom sensor 52 either senses a preprogrammed distance from the bottom of the container or produce in the container (or senses the bottom of the container or produce in the container by way of a pressure sensor, resistance sensor or the like), it signals the CPU 48 which in turn signals the motor 32 to stop lowering the flexible panel 30. The CPU 48 then signals the actuator 42 to move the platform section 38 into the open position (See FIGS. 1 and 3) releasing the column of the produce 16 into the container 20 (See FIG. 7c). The CPU 48 can either keep the platform section 38 open for a preprogrammed period of time, or a level sensor 46 or another sensor associated with the platform section 38 (such as a pressure sensor, optical sensor or other suitable sensor) senses that the produce has been dispensed from the chute 12.

In some embodiments, a resistance sensor can be used on the actuator 42 that signals resistance when the platform section 38 attempts to open against produce in the container. The resistance sensor can relay this information to the CPU 48, which can respond by raising the platform section 38 a preset distance before again attempting to open the platform section.

When the fill sensor 44 indicates that top of the chute is empty, the CPU 48 signals the actuator 42 to move the platform section 38 into a closed or partially closed position (See 600 of FIG. 12A). As the chute continues to fill with produce, the fill sensor 44 signals the CPU 48 that the chute 12 is again full. The platform section 38 will either again open up under the weight of the produce 16, or in another embodiment the CPU 48 receives the "full" signal from the fill sensor 44 and signals the actuator 42 to move the platform section 38 into the open position (See 700 in FIG. 12A). When the fill sensor 44 indicates that top of the chute is empty, the CPU 48 signals the actuator 42 to move the platform section 38 into a closed or partially closed position. (See 800 in FIG. 12A). When the fill sensor again indicates that the chute is full, the CPU 48 signals the actuator 42 to move the platform section 38 to the open position. If the fill sensor 44 indicates that the chute is still full, the CPU 48 signals the motor 32 to raise the flexible panel 30 a predetermined amount or until the fill sensor indicates that the top of the chute is again empty (See 900 of FIG. 12A). When the fill sensor 44 again indicates that top of the chute is empty, the CPU 48 signals the actuator 42 to move the platform section 38 into a closed or partially closed position. (See 1000 of FIG. 12A). As the chute continues to fill with produce, the fill sensor 44 signals the CPU 48 that the chute 12 is again full. The platform section 38 can either open under the weight of the produce 16, or in another embodiment, the CPU 48 receives the "full" signal from the fill sensor 44 and signals the actuator 42 to move the platform section 38 into the open position (See 1100 in FIG. 12A).

Where opening of the platform 38 section fails to clear the fill sensor 44, the CPU 48 may be programmed with a time delay and repeat cycle. (Compare 1200 and 1300 in FIG. 12A). In these embodiments, the CPU 48 signals the platform 38 to cycle open and closed multiple times with a hold period at each stage of the cycle. For example, the platform 38 may be actuated for 1 second open and then 1 second closed for a predetermined number of cycles. If the multiple cycles are completed without the fill sensor 44 clearing, then this is an indication that no additional produce 16 can flow out of the bottom of the chute 12 as the chute is presently positioned. The CPU 48 is programmed to respond by raising the flexible panel 30 a predetermined amount. The cycling of the platform 38 continues, followed by raising of the flexible panel 30, until the fill sensor 44 indicates that the top of the chute is again empty. (Compare 1300-1600 in FIG. 12A). The process of opening, closing and raising the platform section 38 continues as described above until a stable column of produce 16 reaches the top of the container. (See 1200-2110 in FIGS. 12A and 12B).

In some embodiments or for some applications, the CPU 48 may be user programmed to idealize the performance for particular chute/produce combinations. For example, with certain produce types, user experience may dictate delay periods or repeating certain portions of the operation cycle to account for stoppages within the chute.

The CPU can either keep track of the amount that the flexible panel 30 has been raised to determine the vertical positioning of the platform section 38, or a level sensor 46 can be used to determine the position of the platform section 38. Suitably the container 20 is filled to near the top 22 of the container 20 on the end that the produce 26 is delivered into the container 20 by the conveyor 18. At this point the flexible panel 28 is high enough in the chute 12 so that the panel 28 is near the conveyor 18 and the pile is also to that level such that there is an acceptable distance between the conveyor 18 and the top of the pile of the produce. The produce can then be deposited directly into the container 20 on top of the produce 16 which has already filled a portion of the container.

In another embodiment, the CPU 48 can be programmed to raise, lower, open and close the platform section at preprogrammed times. An operator could program the CPU 48 to perform certain actions at certain times, in a certain order using a similar process as described above and depicted in FIGS. 12A and 12B. In this embodiment, the produce 16 falls off the end or side of the conveyor 18 into the opening of the top 14 or side of the chute 12. The flexible panel 30, and, in turn, the platform section 38, of the chute 12 are initially in a predetermined starting position (See FIG. 7a) with the platform section 38 in the closed position (See FIG. 2). The produce 16 entering the chute 12 falls only a short distance until it reaches and rests either on the platform section 38 or on produce 16 already resting on the platform section 38. After a preprogrammed period of time from when the produce starts entering the chute 12 (which can either be signaled from a sensor positioned on or near the conveyor, or manually activated by a user initiating the operation of the device 10) the CPU 48 signals the motor 32 to lower the flexible panel 30 a first preprogrammed amount. In another embodiment, a fill sensor 44 can be used to determine that the produce 16 has filled the chute 12 to the level of the sensor 44. The sensor can then signal the CPU 48 that the chute 12 is "full" and the CPU 48 signals the motor 32 to lower the flexible panel 30, and therefore the platform section 38, to a first preprogrammed amount. As the flexible panel 30 is lowered, the platform section 38 connected to the bottom 40 of the flexible panel 30 is lowered further down into the chute 12 (See FIG. 7b). When the flexible panel 30 is done moving the first predetermined amount, the CPU waits another preprogrammed amount of time, and again lowers the flexible panel another preprogrammed amount. This action is repeated until the flexible panel is lowered a final preprogrammed distance, which suitably is a distance that places the platform section 38 suitable near the bottom of the container. The platform section 38 can either open or partially open under the weight of the produce in one embodiment, or in another embodiment the CPU 48 signals the actuator 42 to move the platform section 38 into the open position (See FIGS. 1 and 3) releasing the produce 16 into the container 20 (See FIG. 7c). The CPU 48 keeps the platform section 38 open for another preprogrammed period of time and signals the motor 32 to raise the platform section a predetermined amount and closes the platform section. The process is then begun again; however a new "final" preprogrammed distance of the flexible panel 30 is used to trigger the opening of the platform section 38, in recognition of the produce already at the bottom of the container. The process is continually repeating using different preprogrammed times and distances until the container is full. One of ordinary skill in the art can program the CPU with the preprogrammed periods of time and distances to suit the specific container size, produce delivery rate and produce size such to allow for the filling of the container. The times and distances can be done by mathematical calculation of the various pertinent variables (produce size, size of platform section, size of container, rate of delivery of produce to the device) or by trial runs of the device 10 by manual control by the user to determine the optimum times and distances that the device should utilize (or a combination of both). In other embodiments, the CPU 48 can be used with preprogrammed times to open and close the platform section 28, along with sensor data from various fill 44, level 46 and bottom 52 sensors to raise and lower the platform section 38 appropriately to provide for the device 10 filing the container with produce. One of skill in the art would readily appreciate such combinations.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as they fall within the scope of the appended claims.

What is claimed is:

1. A device for transporting produce over a vertical distance comprising:
   a chute formed by a back wall, side walls, and tracks for receiving a movable panel;
   a movable panel, wherein the panel is received by the tracks of the chute and thereby encloses a portion of the chute;
   a drive system operable to engage and reposition the panel with respect to the chute;
   a platform connected to the bottom of the panel and thereby forming a movable bottom portion of the chute;
   an actuator connected to the platform, wherein the actuator can move the platform from a closed to an open position;
   at least one fill sensor; and
   a central processing unit operatively connected to the drive system, the actuator, and the fill sensor, wherein the central processing unit coordinates transporting produce over a vertical distance through movement of the panel and actuation of the platform.

2. The device of claim 1 wherein the panel is a flexible panel made from plastic and has gear treads which interface with the drive system.

3. The device of claim 1 wherein the drive system is a motor-driven right angle worm drive.

4. The device of claim 1, wherein the fill sensor can detect the presence of produce within the chute.

5. The device of claim 1, further comprising a bottom sensor operable to detect the proximity of the platform to a bottom of a tank that the chute is positioned within, or the proximity of produce that is in the bottom of the tank that the chute is positioned within.

6. A method for transporting produce over a vertical distance from a top of a tank to a bottom of a tank comprising:
   a) providing the device of claim 5 within the tank;
   b) flowing materials into the top of the chute;
   c) using the fill sensor to detect the presence of produce near the top of the chute;
   d) using the central processing unit to instruct the drive system to move the platform toward the bottom of the chute;
   e) repeating steps c) and d);
   g) using the bottom sensor to detect the proximity of the platform to the bottom of the tank or produce positioned on the bottom of the tank;
   h) using the central processing unit to instruct the actuator to move the platform to an open position to dispense produce; and
   i) dispensing the produce;
   j) using the central processing unit to instruct the drive system to move the platform a predetermined distance away from the bottom of the tank or produce positioned within; and
   k) using the central processing unit to instruct the actuator to move the platform to a closed or partially closed position upon a signal from the fill sensor.

7. The method of claim 6, further comprising repeating steps b) to k) in a continuous loop until the produce is dispensed in a pile reaching near the top of the chute.

8. A device for transporting produce over a vertical distance comprising:
   a tank having a tank side wall and a bottom;
   a chute formed by a back wall, chute side walls, and tracks for receiving a flexible panel, wherein the chute is adjacent to the tank side wall;
   a flexible panel, wherein the flexible panel is received by the tracks of the chute;
   a drive system operable to engage and reposition the flexible panel with respect to the chute;
   a platform connected to the bottom of the flexible panel and thereby forming a movable bottom portion of the chute;
   an actuator connected to the platform, wherein the actuator can move the platform from a closed to an open position; and
   a central processing unit operatively connected to the drive system and the actuator, wherein the central processing unit coordinates transporting produce over a vertical distance.

9. The device of claim 8 wherein the flexible panel is made from plastic and has gear treads which interface with the drive system.

10. The device of claim 8 wherein drive system is a motor-driven right angle worm drive.

* * * * *